(12) United States Patent
Suzuki et al.

(10) Patent No.: US 7,318,621 B2
(45) Date of Patent: Jan. 15, 2008

(54) STRUCTURE FOR SECURING A PROTECTOR TO A VEHICLE BODY

(75) Inventors: Takashi Suzuki, Yokkaichi (JP); Hiroshi Sasaki, Yokohama (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 148 days.

(21) Appl. No.: 11/142,338

(22) Filed: Jun. 2, 2005

(65) Prior Publication Data

US 2005/0280288 A1    Dec. 22, 2005

(30) Foreign Application Priority Data

Jun. 21, 2004    (JP) .............................. 2004-182774

(51) Int. Cl.
*B60K 37/00*    (2006.01)
(52) U.S. Cl. ..................................... 296/208; 296/1.08
(58) Field of Classification Search ............... 296/1.07, 296/1.08, 208; 174/40 CC, 70 R, 72 A, 174/535, 545; 248/274.1, 276.1, 298.1, 376.1; 403/3, 4, 13, 14, 348
See application file for complete search history.

(56) References Cited

U.S. PATENT DOCUMENTS

| | | | | |
|---|---|---|---|---|
| 3,003,600 | A * | 10/1961 | Mackenzie | .................... 52/633 |
| 3,019,866 | A * | 2/1962 | Grabowski | ...................... 403/4 |
| 3,213,500 | A * | 10/1965 | Thompson | .................. 403/397 |
| 4,344,717 | A * | 8/1982 | Merz | .............................. 403/14 |
| 4,474,492 | A * | 10/1984 | Fleitas | ..................... 403/322.4 |
| 5,423,647 | A * | 6/1995 | Suzuki | ........................ 411/433 |
| 5,595,454 | A * | 1/1997 | Bogaerts et al. | ............ 403/263 |
| 5,632,567 | A * | 5/1997 | Lowe et al. | ..................... 403/3 |
| 5,642,641 | A * | 7/1997 | Maxfield et al. | .............. 72/358 |
| 6,233,792 | B1 * | 5/2001 | Kanie | ........................... 24/290 |
| 6,677,526 | B2 * | 1/2004 | Kishizawa | ................. 174/68.1 |
| 6,723,920 | B2 * | 4/2004 | Higuchi et al. | ................ 174/50 |

(Continued)

FOREIGN PATENT DOCUMENTS

EP           337884 A1 * 10/1989    .................. 403/14

(Continued)

*Primary Examiner*—Dennis H Pedder
*Assistant Examiner*—Paul Chenevert
(74) *Attorney, Agent, or Firm*—Oliff & Berridge PLC

(57) ABSTRACT

To easily attach a protector to a vehicle body panel and to prevent the protector from being shifted after securing the protector to a vehicle body by absorbing an error in position between clips provided on the protector and locking holes formed in the vehicle body panel. Two clips being locked on a vehicle body are integrally formed on a wall of a protector for sheathing a wire harness. The clips have locking pawls disposed on the opposite lateral sides of the clips. The locking pawls are inserted into locking holes in a vehicle body panel so that the locking pawls engage the peripheral edges of the opposed sides of the locking holes, thereby securing the protector to the vehicle body panel. Provided that "A" is a length of each locking hole at a side engaging each of the locking pawls, "B" is a length of the clip in a direction perpendicular to the locking pawl, and "C" is a length of the other clip, the length B is set to satisfy the equation (B=A−1 mm) and the length C is set to satisfy the equation (C<A−4 mm). Thus, the clip may be shifted in the locking hole within a distance of below 0.5 mm.

4 Claims, 4 Drawing Sheets

U.S. PATENT DOCUMENTS 6,844,497 B2 * 1/2005 Frantz et al. ............. 174/72 A
6,966,722 B1 * 11/2005 Borror et al. ................. 403/3
7,019,215 B2 * 3/2006 Arai ........................ 174/72 A
2003/0189352 A1 * 10/2003 Iiya .......................... 296/1.08
2005/0280288 A1 * 12/2005 Suzuki et al. ............... 296/208

FOREIGN PATENT DOCUMENTS

JP  A 2003-274533  9/2003

* cited by examiner

STRUCTURE FOR SECURING A PROTECTOR TO A VEHICLE BODY

CROSS-REFERENCE TO RELATED APPLICATION

The invention claims priority to Japanese Patent Application No. JP 2004-182774 filed on Jun. 21, 2004. The disclosure of the prior application is incorporated herein by reference in its entirety.

BACKGROUND

This invention relates to a structure for securing a protector to a vehicle body and particularly to a structure in which misalignment in position between a protector and a vehicle body panel can be prevented by improving a configuration of a locking clip of the protector to be secured to the vehicle body panel.

A wire harness to be arranged in a motor vehicle may be received in a protector produced by a resin-molding method at a given arrangement location on account of restriction of passage and enhancement of protective function. When the protector that receives the wire harness is secured to the vehicle body panel, a clip provided on the protector may be inserted into and engaged with a locking hole formed in the vehicle body panel. Such a kind of protector includes a clip in which an axial portion projects from an exterior of a protector and a wing portion extends from each of opposite sides of the distal end of the axial portion, a clip in which a locking pawl projects from each of lateral opposite sides of clip body having a parallelepiped configuration, and the like.

In the case where two or more clips are provided on a wall of the protector and are spaced away from each other at a given distance in the longitudinal direction, a length of each clip on the protector in the longitudinal direction has a length set to be smaller by a distance of about 4 mm than a length of each locking hole in the longitudinal direction. The difference in length enables absorption of an error in dimension between a distance between the clips and a distance between the locking holes. Consequently, even if a certain error is caused between the distance between the clips and the distance between the locking holes, the clips may be inserted into the locking holes and the protector may be fixed on the vehicle body panel.

However, in the above construction, because a clearance is produced between the locking hole in the vehicle body panel and the clip inserted in the locking hole, the protector may be shifted on the vehicle body panel at either side in the longitudinal direction within a distance of about 2 mm after the protector has been locked on the vehicle body. This will deteriorate accuracy in dimension of the wire harness and will cause the protector to vibrate on the vehicle body panel to generate noise.

Particularly, in the case where the vehicle body panels are coupled to each other between adjacent locking holes, because an error in dimension will tend to be caused between the locking holes, the above length of the clip is set to be smaller by a distance of about 7 mm than the above length of the locking hole. Consequently, the misalignment in position of the protector may be exacerbated after locking the protector onto the vehicle body, contributing to the above problems.

The present applicant has disclosed a protector 1 shown in FIG. 5 in Japanese Patent Public Disclosure 2003-274533. The protector 1 includes a body section 2 provided on given positions on upper portions of opposite side walls 2a with guide frame portions 2b, and clips 3 separated from the body section 2. The clip 3 may be slid into and attached to the body section 2. Because the clip 3 may move slidably in the protector 1 after the clip 3 has been attached to the body section 2 of the protector 1, even if an error in dimension is produced between a distance between the clips 3 and a distance between locking holes, the clips 3 are slid to given positions to absorb the error in dimension. Thus, the clips are inserted into the locking holes and the protector may be fixed on the vehicle body panel.

In the protector disclosed in the '533 reference, because the clips 3 are slid in the body section 2 to absorb the error in dimension, it is not necessary to make the clip 3 smaller than the locking hole. However, because the clips 3 are attached to the body section 2 slidably within a given distance, the body section 2 may be shifted with respect to the vehicle body panel when the clips 3 are slid in the body section 2. Separation of the clips 3 from the body section 2 may increase the number of man-hours for assembling the clips 3 onto the body section 2.

SUMMARY

In view of the above problems, an object of various exemplary embodiments is to provide a structure for securing a protector to a vehicle body in which the protector can be easily attached to the vehicle body and prevented from being shifted after the protector has been secured to the vehicle body by improving a configuration of clips integrally formed on the protector and by absorbing an error in position between clips provided on the protector and locking holes formed in the vehicle body panel.

In order to solve the above problems, various exemplary embodiments provides a structure for securing a protector to a vehicle body. The protector is adapted to sheathe a wire harness to be arranged in a motor vehicle. Two or more clips being locked on a vehicle body are integrally formed on a wall of the protector. The clips are provided on the opposite sides with locking pawls, respectively. The locking pawls are inserted into locking holes in a vehicle body panel so that the locking pawls engage peripheral edges of the opposed sides in the locking holes, thereby securing the protector to the vehicle body panel.

Provided that symbol "A" is a length of each of the locking holes at a side engaging each of the locking pawls, symbol "B" is a length of at least one of the clips in a direction perpendicular to the locking pawls, and symbol "C" is a length of the other clips, the length B is set to satisfy the equation (B=A−1 mm) and the length C is set to satisfy the equation (C<A−4 mm), and thus, the clips can be shifted in the locking holes within a distance of below 0.5 mm.

According to the above construction, because the clip having the length B (B=A−1 mm) in the longitudinal direction can be shifted at the opposite sides in the longitudinal direction in the locking hole within a distance of below 0.5 mm, misalignment in position of the protector relative to the vehicle body panel can be set within a distance of below 0.5 mm. Thus, the misalignment in position can be avoided between the protector and the vehicle body panel. Consequently, the wire harness W/H received in the protector will not be subject to deterioration of accuracy in dimension and noise caused by vibration of the protector can be eliminated Since the longitudinal length C (C<A−4 mm) of the other clips except for the clip having the longitudinal length B is set to be substantially smaller than the longitudinal length A of the locking holes, the other clips can absorb the error in dimension between the clips and the locking holes and the protector can be easily and positively fixed on the vehicle body panel.

Each of the clips includes a clip body having a rectangular parallelepiped configuration. The clip body includes locking pawls on the opposite lateral sides. Each of the locking holes has a rectangular shape. The clips can be shifted in the locking holes within a distance of below 0.5 mm in the longitudinal direction.

According to the above construction, although the given clip has the length B (B=A−1 mm) in the longitudinal direction to define a small clearance between the clip and the locking hole, the locking pawls can be inserted into and engaged with the locking holes, because the locking pawls of the clips are provided on the lateral opposite sides of the clips.

In the case where vehicle body panels are joined to each other between adjacent locking holes, the length C is set to satisfy the equation (C<A−7 mm)

In the case where the vehicle body panels are connected to each other between the adjacent locking holes, although accuracy in dimension of the locking holes should deteriorate and an error in dimension between the clips and the locking holes should tend to increase, the clips can absorb such a great error so that the clips can be inserted into and engaged with the locking holes, thereby enabling the protector to be fixed on the vehicle body panel. Although the length C of the clip is set to satisfy the equation (C<A −7 mm), the clip can position the protector on the vehicle body panel so that misalignment in position hardly causes vibrations that generate noise because the given clip keeps the length B (B=A −1 mm).

As described above, according to the present invention, because the protector is provided with a clip having the length B (B=A−1 mm) in the longitudinal direction and a clip having the length C (C<A−7 mm), the clip having the length B can prevent misalignment in position of the protector while the clip having the length C can absorb the error between the clips and the locking holes. Accordingly, when these clips are inserted into the locking holes, the protector can be surely fixed on the vehicle body panel.

BRIEF DESCRIPTION OF THE DRAWINGS

Various details are described below with reference to the following figures, wherein.

DETAILED DESCRIPTION OF EMBODIMENTS

Figure 1A:
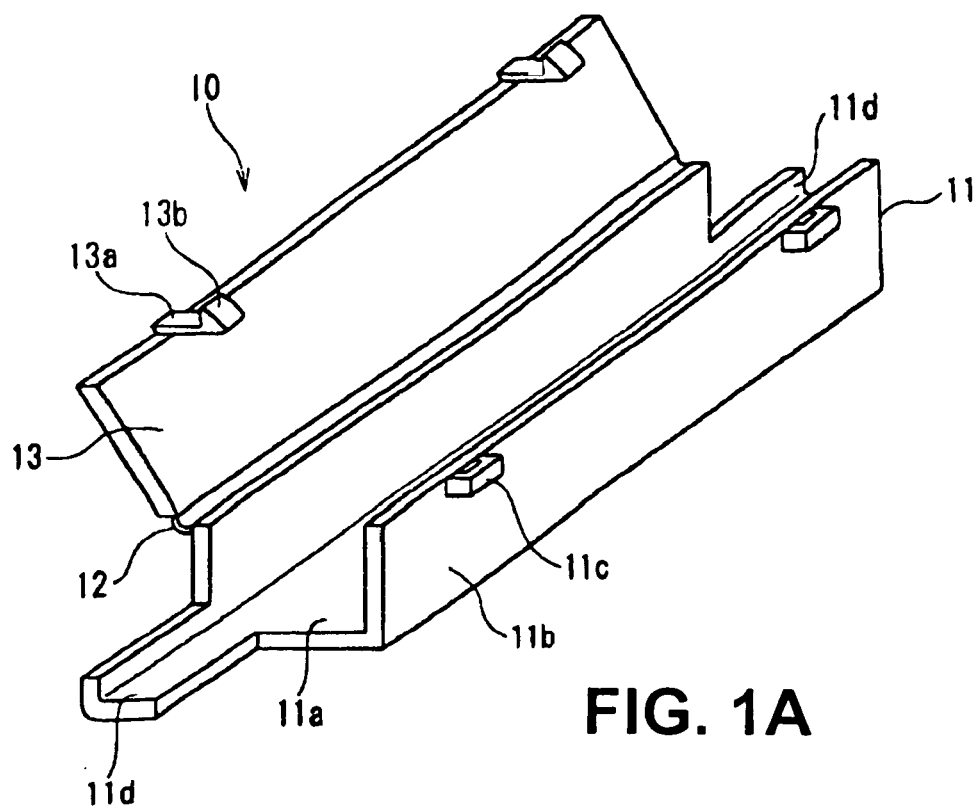
FIG. 1A is a perspective view of a first embodiment of a protector in accordance with the present invention, illustrating the view taken from an upper side.

The following detailed description refers to a wire harness protector to be received in a vehicle body. The exemplary methods and systems may refer to, for example, a trough-like wire harness, for sake of clarity and familiarity. However, it should be appreciated that the principles described herein, may equally be applied to any known or later-developed protectors, beyond the examples specifically discussed herein.

Referring now to the drawings, embodiments of a protector in accordance with various exemplary embodiments will be described below.

Figure 1B:
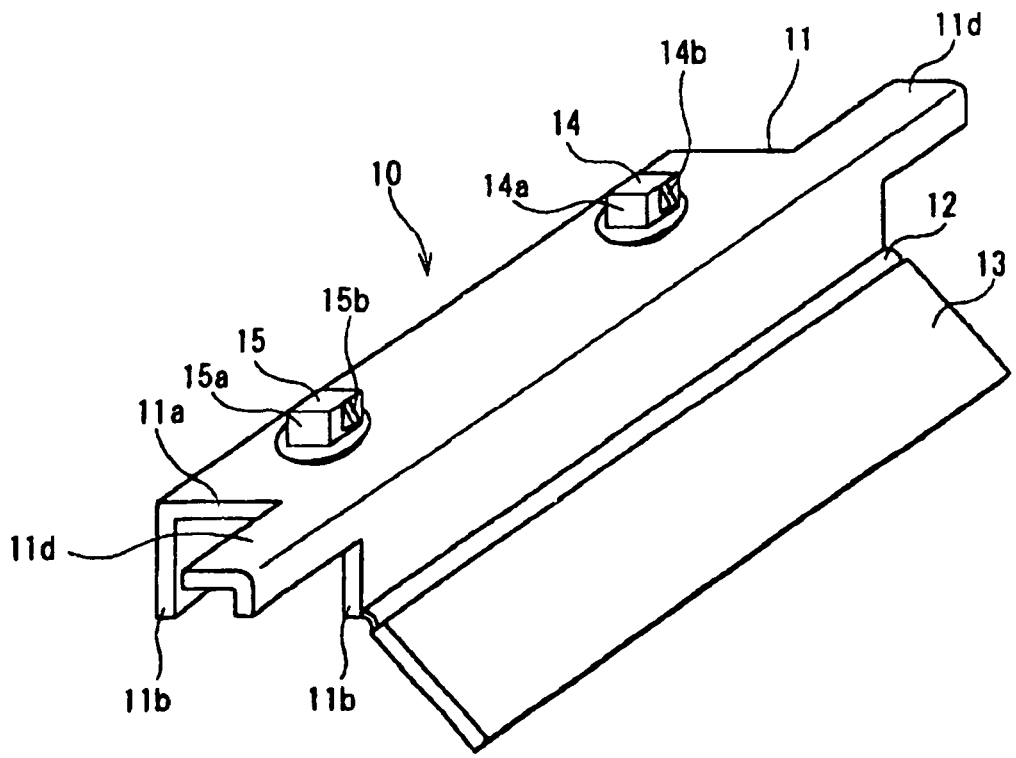
FIG. 1B is a perspective view of a first embodiment of a protector in accordance with the present invention, illustrating the view taken from a lower side.
Figure 2:
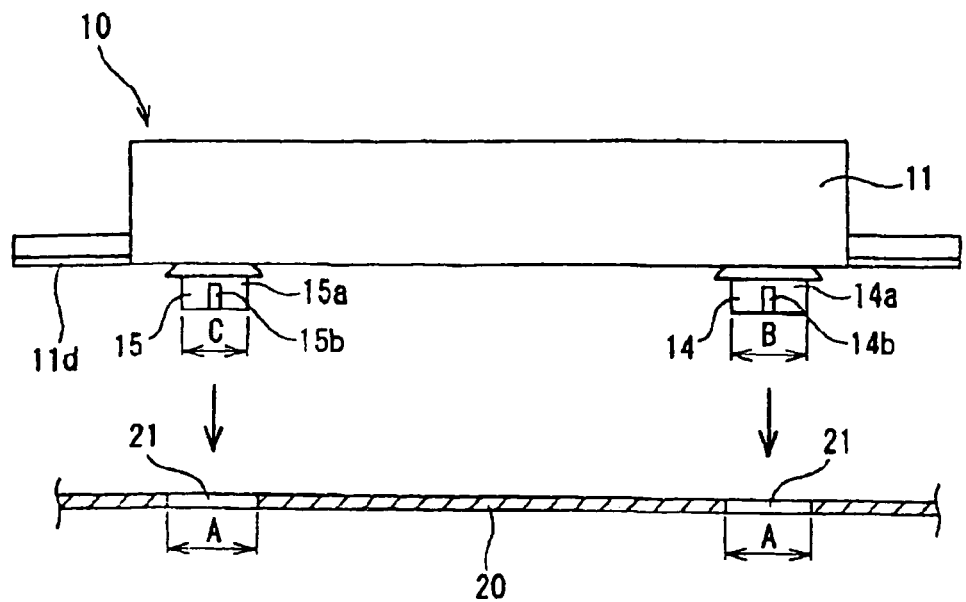
FIG. 2 is a side elevation view of the protector, illustrating a relationship in position between clips on the protector and locking holes in a vehicle body panel.
Figure 3:
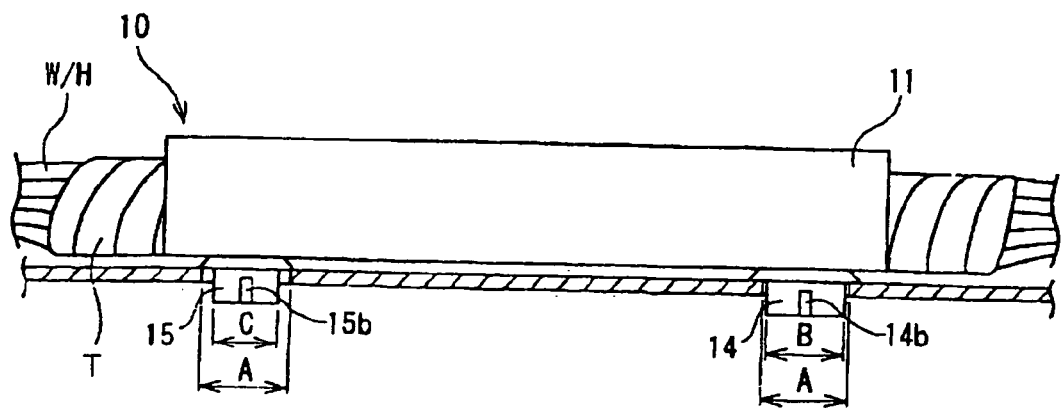
FIG. 3 is a side elevation view of the protector secured to the vehicle body panel.

FIGS. 1 to 3 show a first embodiment of a protector. A protector 10 includes a trough-like body section 11 having a bottom wall 11a and side walls 11b projecting upward from the opposite side ends of the bottom wall 11a in a width direction, and a lid section 13 coupled through a thin hinge portion 12 to one of the side walls 11b. Two clips 14 and 15 project downward from a lower surface of the bottom wall 11a of the body section 11 and they are spaced away from each other at a given distance.

U-shaped locking blocks 11c can be disposed at the given positions on an upper end of an outer surface of the other side wall 11b of the body section 11. Locking pieces 13a each having a lid locking pawl 13b are provided on a lateral distal end of the lid section 13 that has no thin hinge portion 12 so that the respective locking pieces 13a can be opposed to the respective locking blocks 11c. After a wire harness W/H has been received in the body section 11, the lid section 13 is turned toward the body section 11 about the thin hinge portion 12 and then the lid locking pawls 13b are inserted into and engaged with the locking blocks 11c. Thus, the lid section 13 closes the upper open space of the body section 11.

Furthermore, a tape-winding tongue piece 11d having an L-shaped configuration in cross section is disposed on each of the opposite longitudinal ends of the body section 11 so that a tape is wound around the wire harness W/H extending through the protector 10.

The clips 14 and 15 may include clip bodies 14a and 15a, each having a rectangular parallelepiped configuration and disposed on the opposite lateral sides with locking pawls 14b and 15b. The clips 14 and 15 are disposed on the protector 10 and spaced away from each other at the given distance so that the longitudinal direction of the clips 14 and 15 accords with the longitudinal direction of the protector 10.

As shown in FIG. 2, a length B of the clip 14 in the longitudinal direction is set to be greater than a length C of the clip 15 in the longitudinal direction. Locking holes 21, each having a rectangular shape, can be disposed in a vehicle panel 20 to receive the clips 14 and 15. Provided that symbol "A" is a length of each locking hole 21 in the longitudinal direction, a relationship among the lengths A, B, and C satisfies the equations (B=A−1 mm) and (C<A−4 mm) in the present embodiment. In the present embodiment, the length A of the locking hole 21 in the longitudinal direction is set to be 15 mm, the length B of the clip 14 in the longitudinal direction is set to be 14 mm (A−B=1 mm), and the length C of the clip 15 in the longitudinal direction is set to be 10 mm (A−C=5 mm).

The wireless harness W/H is received in the protector 10 and secured to the tape-winding tongues 11d by winding a tape T around the wire harness W/H and tongues 11d. The clip 14 having the greater length B in the longitudinal direction is opposed to the locking hole 21 in the vehicle body panel 20 in order to fix the protector 10 on the vehicle body panel 20. This arrangement enables the clips 14 and 15 to be inserted into the locking holes 21.

At this time, the length C of the other clip 15 in the longitudinal direction is set to be smaller than the length A of the locking hole 21 in the longitudinal direction by a distance of 5 mm. Thus, even if there is an error in dimension between a distance between the clips 14 and 15 and a distance between the locking holes 21, the error can be absorbed by the clip 15 having the shorter length. This enables the clip 15 to be inserted into the locking hole 21 positively. When the clips 14 and 15 are inserted into the locking holes 21, as shown in FIG. 3, upper surfaces of the locking pawls 14b and 15b on the clips 14 and 15 engage the opposite peripheral edges of the locking holes 21 in the lateral direction and the protector 10 is secured to the vehicle body panel 20.

Also, the clip 14 having the length B in the longitudinal direction can be shifted at the opposite sides in the longitudinal direction in the locking hole 21 only by the distance of below 0.5 mm. Thus, misalignment in position of the protector 10 relative to the vehicle body panel 20 can be set below 0.5 mm, thereby avoiding the misalignment in position of the protector 10. Consequently, the wire harness W/H received in the protector will not be subject to deterioration of accuracy in dimension and noise caused due to rattle of the protector 10 can be eliminated.

At least one clip 15 or a plurality of clips 15 having the length B in the longitudinal direction may be disposed on the protector 10. Three or more clips having the lengths B and C in the longitudinal direction may be disposed on the protector 10.

Figure 4:
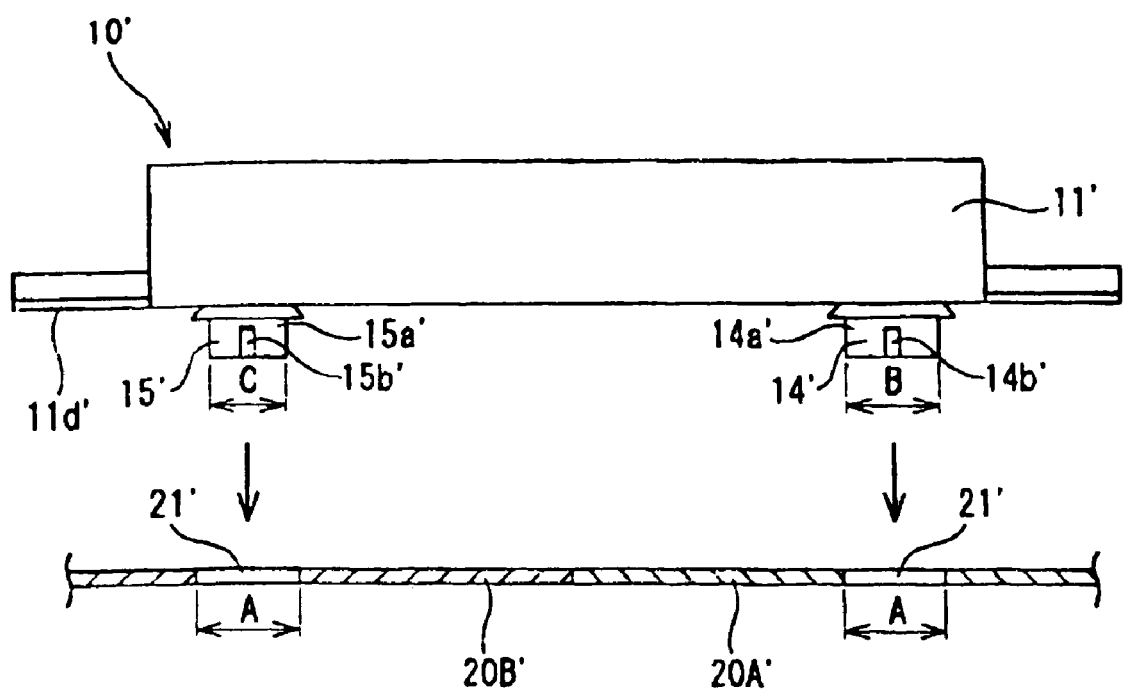
FIG. 4 is a side elevation view of a second embodiment of a protector in accordance with the present invention.
Figure 5:
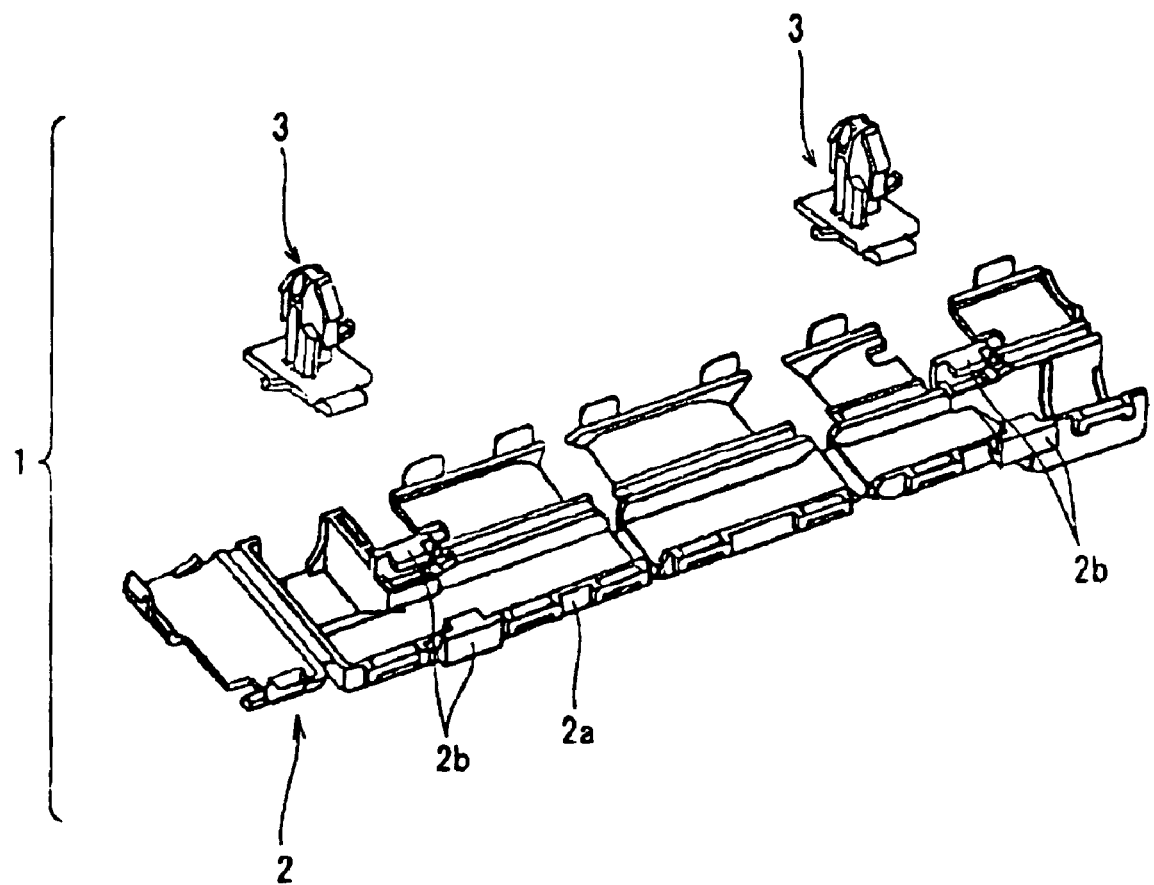
FIG. 5 is a perspective view of a conventional protector.

FIG. 4 shows a second embodiment of the protector in accordance with the present invention. In the second embodiment, vehicle body panels 20A' and 20B' are joined to each other between adjacent locking holes 21' and the locking holes 21' in the respective vehicle body panel 20A' and 20B' can produce errors in dimension. Accordingly, a length C of a clip 15' of a protector 10' in the longitudinal direction is set to be 7 mm, which is smaller than the length C of the clip 15 in the first embodiment and is smaller by 8 mm than a length A (=15 mm) of the locking hole 21' in the vehicle body panel 20A' in the longitudinal direction (A–C=8 mm).

According to the above structure, even if the vehicle body panel 20 A' and 20B' are joined to each other between the adjacent locking holes 21' and errors in dimension occur in the locking holes, the errors in dimension will be absorbed by the clip 15' that has a greatly reduced dimension, thereby enabling the protector 10' to be fixed on the vehicle body panels 20A' and 20B'.

The clip 14' has a greater dimension in the longitudinal direction as in the case of the above first embodiment, thereby reducing misalignment of the protector position. Because the other constructions and operational effects in the second embodiment are the same as those in the first embodiment, explanations of them are omitted here by employing similar reference numbers to the same elements.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art that are also intended to be encompassed by the following claims.

What is claimed is:

1. A structure for securing a protector to a vehicle body, the protector being adapted to sheathe a wire harness to be arranged in a motor vehicle, the structure comprising:
    at least two clips that include opposite lateral sides and corresponding locking pawls, the clips being integrally formed on a wall of the protector, each clip having a rectangular parallelepiped configuration with a longitudinal direction corresponding to a longitudinal direction of the protector, wherein the locking pawls are inserted into locking holes in a first vehicle body panel so that the locking pawls engage peripheral edges of opposed sides in the locking holes, thereby securing the protector to the first vehicle body panel,
    wherein provided that "A" is a length of each of the locking holes at a side engaging each of the locking pawls, "B" is a length of at least one of the clips in a direction perpendicular to the locking pawls, and "C" is a length of the other clips, the length B satisfies the equation (B >C) and the length C satisfies the equation (C<A −4mm), and where the clips can be shifted in the locking holes within a distance of below 0.5 mm.

2. The structure for securing a protector to a vehicle body according to claim 1, further comprising a second vehicle body panel, wherein the first vehicle body panel and the second vehicle body panel are joined to each other between adjacent locking holes, the length C is set to satisfy the equation (C<A −7 mm).

3. The structure for securing a protector to a vehicle body according to claim 1, wherein the clip body is provided on the opposite lateral sides with locking pawls, each of the locking holes has a rectangular shape, and the clips can be shifted in the locking holes within a distance of below 9.5 mm in the longitudinal direction.

4. The structure for securing a protector to a vehicle body according to claim 3, further comprising a second vehicle body panel, wherein the first vehicle body panel and the second vehicle body panel are joined to each other between adjacent locking holes, the length C is set to satisfy the equation (C<A −7 mm).

* * * * *